Oct. 11, 1932.  J. BUTTICCI  1,882,117
PORTABLE FRUIT PRESS
Filed March 10, 1931    2 Sheets-Sheet 1
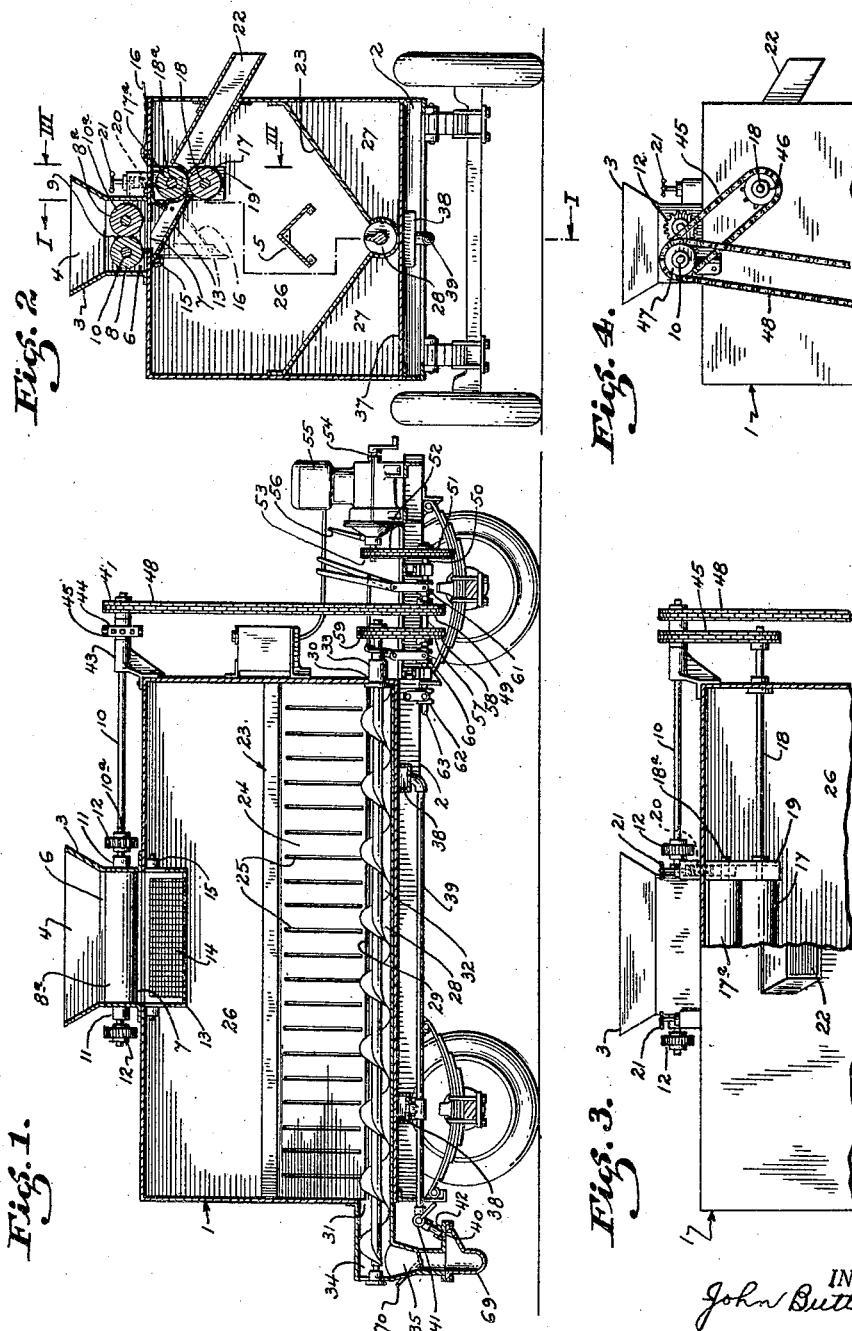
INVENTOR.
John Butticci
BY
ATTORNEY

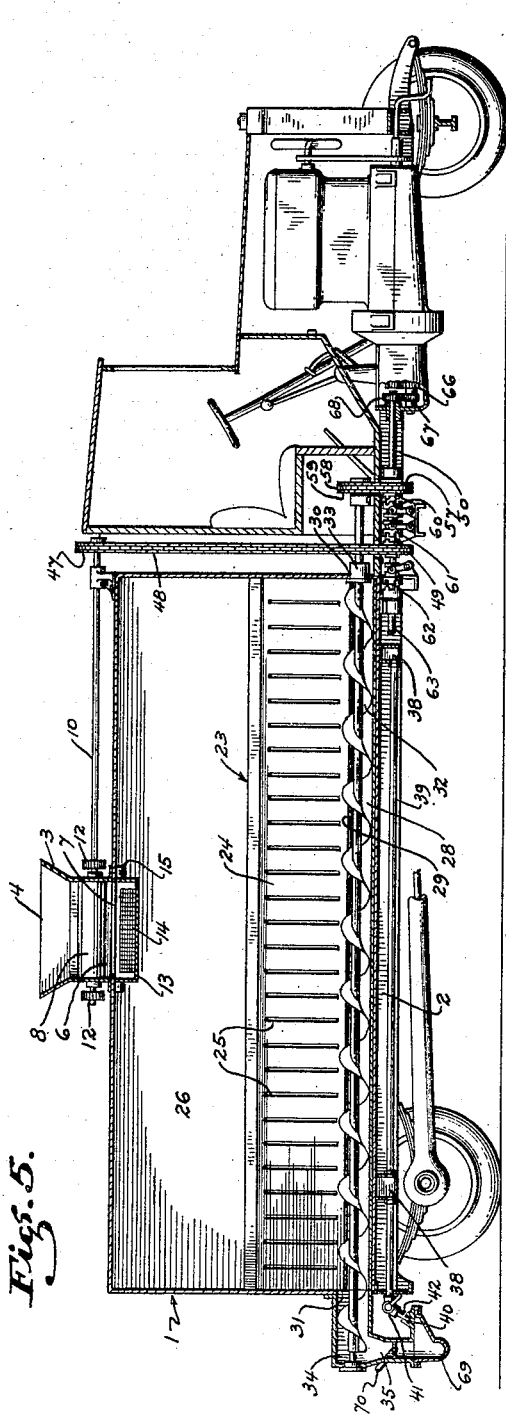

Patented Oct. 11, 1932

1,882,117

UNITED STATES PATENT OFFICE

JOHN BUTTICCI, OF SAN FRANCISCO, CALIFORNIA

PORTABLE FRUIT PRESS

Application filed March 10, 1931. Serial No. 521,481.

This invention relates to portable presses, particularly adapted to use in the fruit industry for pressing juices from fruit in the field or at a depot point to which the fruit has been previously conveyed.

The invention is particularly adapted for use in districts or territories of the country where fruit is grown in large quantities, though equally adapted to use at consignment points where fruit is assembled in quantities by shipment and the juice pressed therefrom at the place of consignment.

Further advantageous use is found in the rapidity with which the juice of freshly crushed fruit may be delivered to hospitals, dispensing stands, hotels and restaurants. Heretofore, it has been the practice to pick fruit, load it on vehicles and haul it to a general point of assembly, and ship the collected fruit from that point to the point at which the juice is to be pressed therefrom. This results in the bruising of the fruit, and, as is well known, the juices of many fruits such as apples, begin to ferment, or at least lose their natural flavor and sweetness very rapidly after the bruising of the fruit. It is desirable, therefore, that the juice be pressed from the fruit immediately or at least very promptly when the fruit is severed from the tree or vine. It is also often desirable that the cost be saved of transporting the refuse pulp from the place of growing the fruit or from its concentration depot to long distant plants where the juice may be pressed therefrom; another advantage is that the refuse or pulp may be retained at the farm or orchard so that it may be dried and ploughed back into the ground or may be fed to animal stock, such as hogs or chickens. On the other hand, it is also frequently desirable, especially where very rapid delivery to ultimate user is necessary, such as orange juice to hospitals, that the entire pulp be transported and the juice separated from the pulp by filtration in the course of transit, and in this respect the vibration of the vehicle in motion serves to agitate the pulpy bulk so that the juice is assisted in draining therefrom. Frequently it is desirable to elevate the juice from the tank of the press to a receptacle at a greater elevation than the outlet of the tank, and for that purpose a pump is provided to accompany the portable press.

Objects of the invention are to provide a portable press for juices which is adapted for use directly at the place of growth of the product. Further objects are to provide an apparatus for crushing fruit or vegetable products and selectively segregating the juice from the pulp, or combining the juice and pulp in a tank container having a filter therein; to provide for separating the juice from the pulp in course of transit of the tank container; to provide apparatus for separate or joint removal of pulp and juice from the tank; to provide for connection of the mechanism of the press and tank to the motor of motor driven vehicles; to provide a simple, economical and efficient apparatus for expediting the delivering of fresh fruit juices to points of use, and generally, to improve upon apparatus of the foregoing character.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more clearly comprehened the invention, reference is directed to the accompanying drawings, wherein—

Fig. 1 is a longitudinal vertical section on line 1—1 of Fig. 2.

Fig. 2 is a transverse vertical section of the apparatus.

Fig. 3 is a longitudinal vertical side elevation, partly broken away, showing end of tank in vertical section.

Fig. 4 is a vertical end view of detail of a portion of drive mechanism.

Fig. 5 is a longitudinal vertical section of the apparatus connected to motor of motor driven vehicle.

Fig. 6 is a rear end view showing detail of pump connection.

Referring to the drawings, wherein like characters of reference designate corresponding parts, 1 represents a tank of suitable size and any suitable shape, preferably rectangular in transverse section, and which may be of suitable length, preferably elongated relative to its transverse width. It is preferred that the tank be mounted in any suitable manner upon the frame or chassis 2 of a vehicle, so that it may be readily transported on highways or into fields of growing fruits.

Mounted at or adjacent the top portion of the tank is a hopper 3 having an open top or throat 4, and an opening 6 at its bottom which communicates with an opening 7 in the top of the tank. The hopper is preferably elongated in direction of the longitudinal dimension of the tank and mounts longitudinally therein a pair of substantially parallel rotatable rollers 8 and 8a which have faces 9 substantially in contact so that fruit passing therebetween will be fully crushed or macerated. The purpose of these rollers being to draw the fruit downward from the hopper throat, they may also be provided with a roughened surface to grip the fruit more efficiently. The rollers are mounted on and rotate with shafts 10 and 10a which are journalled in the end walls of the hopper, as at 11.

On the shafts 10 and 10a adjacent to and beyond each end of the hopper are mounted intermeshing gears 12, which upon rotation of shafts 10 and 10a rotate rollers 8 and 8a in opposite clock directions. A tray member 13 which has a sieve or strainer 14 is positioned beneath the opening 7, and is hingedly mounted to the inner upper wall of the tank, as at 15. The tray member is manipulated on its hinge by any suitable means, such as cord 16, which has one end attached to the trough member and the other end extending to the outside of the tank where it is easy of access for manual manipulation. A pair of rotatable rollers 17 and 17a, preferably of resilient material, are mounted on and rotate with shafts 18 and 18a journalled in a bracket 19 which is mounted within the upper portion of the tank in any suitable manner. Preferably the rollers 17 and 17a have faces maintained in pressure contact actuated by a coil spring 20, the tension of which is adjustable by hand screws 21. A chute 22 extends from one side of the rollers 17—17a to the outside surface of the tank. In the lower portion of the tank a strainer member of suitable design and material, generally indicated 23, is disposed longitudinally and transversely in the lower portion of the tank chamber and perfectly consists of slats 24 of material which is resistant to corrosion by fruit acids, such as wood, the slats being spaced to allow small orifices 25 therebetween. The strainer member 23 divides the tank chamber into upper chamber 26 and lower chamber 27, and preferably provides a floor for the upper chamber 26 which slopes inwardly and downwardly from the side walls toward the center of the tank, (see Fig. 2). A trough-like member or casing 28 is provided at the foot of the downward slope of the floor of the upper chamber, preferably arcuate in transverse cross-section, the top portion of the trough casing being open as at 29, and having a forward end 30 closed, and its other or rear end open, as at 31. The opening 29 is of lesser width than the transverse inner diameter of the casing, as shown in Fig. 2, so that when a spiral conveyor 32 is rotated therein, the crushed pulp which is semi-liquid in form will be largely within the confinement of the casing and will thus be propelled more readily by the conveyor, instead of being splashed about the chamber, as would be the case if the opening were of the full width of the conveyor.

Within the trough is a snugly fitting rotatable spiral or worm drive conveyor 32 extending longitudinally of said floor of the upper chamber, and having bearing 33 at the closed end of the trough, and preferably having its opposite end passing through the opening 31 and therebeyond into a conduit 34 which has communication with a discharge opening 35 to which a pump 36, of any suitable type, may be connected, and as illustrated is of a centrifugal blower type. The bottom wall of the tank constitutes a floor 37 of the lower chamber and is provided therein with one or more outlet vents 38 to which is suitably attached a pipe 39 which preferably extends to the rear end of the tank adjacent to the opening 35 of the conduit from the upper chamber, and has a discharge opening 40 thereat which is controllable by a manually manipulable valve or cock 41, which also may have connection, as at 42, to the pump 36.

One of the shafts 10 or 10a, preferably 10 has an extension which has bearing in a bracket 43, and mounts a sprocket 44 which engages chain 45 which likewise engages a sprocket 46 mounted on shaft 18, and furnishes a driving means between the rollers 8 and 8a and rollers 17 and 17a. The shaft 10 also mounts a second sprocket 47 engaged by a chain 48 which extends to and passes over a sprocket 49 freely mounted on a journalled shaft 50, the shaft 50 being rotatable by a sprocket 51 engaged by a chain 52 which passes over and is engaged by a sprocket 53 on drive shaft 54 of any suitable motive source, such as an internal combustion engine, generally indicated 55, mounted on the chassis or vehicle frame 2, the engine being provided with a clutch operatively controlled by lever 56.

On shaft 50 is freely mounted a sprocket 57 which through chain 58 is a driving means for sprocket 59 securely mounted on the shaft of the spirial 32. The shaft 50 mounts clutches, preferably three in number, 60, 61 and 62. The clutch 60 when engaged rotates the spiral 32 through chain 58; clutch 61 when engaged rotates the shaft 10, and clutch 62 when engaged rotates a shaft 63 which extends rearwardly to operate pump 36 through usual well known sprockets and chain drive, generally indicated 64. The exhaust opening 65 is adapted to have attached thereto any suitable conduit by which the contents of the tank may be elevated or conveyed to any other receptacle.

Preferably a deflector 5 is mounted longitudinally centrally within the tank underlying the opening 7 for the purpose of directing the pulp or juice outwardly toward the sides of the tank as it falls by gravity toward the strainer member 23.

In Figure 5 the shaft 50 receives its rotation direct from the motor of a motor drawn vehicle. Meshing with the countershaft and gears, generally indicated 66, of the motor are a train of gears 67 one of which is mounted on shaft 50 as at 68. The countershaft and gears 66 are always rotating while the motor is being operated, whether or not the vehicle is in motion by means of its own clutch, and thereby the shaft 50 may be rotated from the motor of the vehicle equally well as from an independent motive source 55, but the later is preferred as it enables the apparatus of the invention to be mounted on relative cheap trailers and distributed throughout a field or orchard and the trailers picked up by a single motor truck and transported as a train.

It will be observed that fruit placed in the hopper 3 will be drawn between the crushing rollers 8 and 8a. When the tray is drawn upwardly by cord 16 to the position shown in full lines of Figure 2, the crushed product drops upon downwardly inclined tray 13 and the free juice drains through sleeve 14, the pulp being directed by the tray to the pressing rollers 17 and 17a which rotate in opposite clock directions and press the remainder of the juice from the pulp, so that all of the juice passes through the sieve 14 and into the upper chamber 26, and the pulp is drawn through the rollers 17 and 17a and discharged through the chute 22. In some instances it is desirable to retain the pulp with the juice for a period of time before pressing all the juice therefrom. This is particularly true where jelly is to be made of the juice, and also for a class of customers who prefer the flavor of the spin to remain in the juice. In the latter events the tray 13 is dropped to the position shown in dotted lines of Figure 2. The juice or the pulp and juice, as the case may be, falls upon the strainer 23, and by the constant agitation from vibration of the vehicle in transit, the juice is filtered through the orifices 25 and flows into the lower chamber 27 in a clarified form, from whence it may be drawn off through the pipe 39. If both pulp and juice are deposited on the strainer 23, the pulp may be removed from the tank by connecting clutch 60 which rotates spiral drive 32 to expel the pulp through opening 31. The pump 36 has a swivel elbow 69 which may be electively connected to the opening 35 for the pulp or to the outlet 40 of pipe 39, so that the product from either source may be exhausted separately, or they may be exhausted as a combined product by having the elbow simultaneously connected to both openings 35 and 40. A cutoff 70 is provided in the conduit 34 so that the opening 35 may be closed if desired. If the first crushing and pressing operation has been done with great rapidity so that some portion of the juice remains in the pulp in the chamber 26, the pulp may be again run through the crusher rollers 8, and the press rollers 17, at the point of destination by attaching any suitable conduit to the opening 65 of the pump and pumping the pulp into the hopper 3 for a second cycle of operation. One of the great advantages of this form of apparatus is the saving of waste in farm and orchard products from small acreage, where it is not profitable to commercially handle small quantities of fruit or transport it to available markets, and which therefore is wasted. With this apparatus it is possible to drive from field to field and save such products, even where the quantities to be handled are very small.

Having thus described my invention, I claim:

1. An apparatus of the character described comprising a tank having an inlet opening, a crusher apparatus adapted to discharge crushed products into said tank, a downwardly inclined strainer member terminating at its lower portion in an imperforate trough and dividing said tank into upper and lower chambers, each of said chambers being provided with an outlet opening having a cutoff valve, a spiral conveyor disposed in the trough and adapted to discharge contents of said upper chamber through the outlet opening thereof, means whereby said crusher and said conveyor may be driven, and clutch means whereby the crusher and conveyor may selectively be driven in unison or independently of each other.

2. An apparatus of the character described comprising a tank having an inlet opening, a crusher apparatus adapted to discharge crushed products into said tank, a downwardly inclined strainer member terminating at its lower portion in an imperforate trough and dividing said tank into upper and lower chambers, each of said chambers being provided with an outlet opening, a cut-off valve associated with each opening, a spiral conveyor disposed in the trough and adapted to discharge contents of said upper chamber through the outlet opening thereof, a pump having a conduit communicating with the outlet of each of said chambers, and clutch means whereby said crusher, conveyor and pump may selectively be driven in unison or independently of each other.

3. In a portable fruit press which includes a vehicle chassis and a tank mounted thereon having an inlet opening, and a crusher apparatus, a strainer device dividing said tank into upper and lower compartments, each of said compartments having an outlet opening provided with a cut-off valve, a conveyor device in the upper compartment adapted to convey crushed fruit through the tank to the outlet opening of the upper compartment, and a pump conduit adapted for communication with each of said openings of the upper and lower chambers.

In testimony whereof I affix my signature.

JOHN BUTTICCI.